United States Patent
Beattie, Jr. et al.

(10) Patent No.: US 8,249,222 B2
(45) Date of Patent: Aug. 21, 2012

(54) METHODS AND APPARATUS TO TRIGGER MAINTENANCE AND UPGRADES OF ACCESS NETWORKS

(75) Inventors: James Gordon Beattie, Jr., Bergenfield, NJ (US); Stephen J. Griesmer, Westfield, NJ (US); Debebe Assefa Asefa, Eatontown, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 921 days.

(21) Appl. No.: 12/334,194

(22) Filed: Dec. 12, 2008

(65) Prior Publication Data

US 2010/0149989 A1 Jun. 17, 2010

(51) Int. Cl.
*H04M 1/24* (2006.01)
*H04M 3/08* (2006.01)
*H04M 3/22* (2006.01)

(52) U.S. Cl. .................. 379/9.03; 379/1.03; 379/15.03; 370/242

(58) Field of Classification Search .............. 379/1.01, 379/1.04, 9, 9.03, 9.04, 9.06, 10.01, 15.01, 379/15.03, 22, 26.01, 1.03; 370/248, 251, 370/252, 241, 241.1, 242, 389
See application file for complete search history.

(56) References Cited

U.S. PATENT DOCUMENTS

| | | |
|---|---|---|
| 5,790,634 A | 8/1998 | Kinser, Jr. et al. |
| 6,463,079 B2 * | 10/2002 | Sundaresan et al. .......... 370/468 |
| 6,477,238 B1 | 11/2002 | Schneider et al. |
| 6,584,148 B1 | 6/2003 | Zitting et al. |
| 6,643,266 B1 | 11/2003 | Pugaczewski |
| 6,788,765 B1 | 9/2004 | Beamon |
| 6,845,148 B1 | 1/2005 | Beamon |
| 7,027,405 B1 | 4/2006 | Khadavi |
| 7,099,439 B2 | 8/2006 | Luneau |
| 7,103,001 B1 * | 9/2006 | Cordsmeyer et al. ......... 370/241 |
| 7,103,795 B1 | 9/2006 | Hansen |
| 7,139,244 B1 * | 11/2006 | Cordsmeyer et al. ......... 370/250 |
| 7,333,593 B2 | 2/2008 | Beamon et al. |
| 7,656,809 B2 * | 2/2010 | Cordsmeyer et al. ......... 370/241 |
| 2003/0004765 A1 | 1/2003 | Wiegand |
| 2004/0086086 A1 | 5/2004 | Butler et al. |
| 2007/0019556 A1 * | 1/2007 | Cordsmeyer et al. ......... 370/241 |
| 2009/0074153 A1 * | 3/2009 | Wu et al. ...................... 379/1.04 |
| 2009/0225672 A1 * | 9/2009 | Yi et al. ........................ 370/252 |
| 2010/0091661 A1 * | 4/2010 | Cordsmeyer et al. ......... 370/241 |

* cited by examiner

*Primary Examiner* — Binh Tieu
(74) *Attorney, Agent, or Firm* — Hanley, Flight & Zimmerman, LLC

(57) ABSTRACT

Example methods and apparatus to trigger maintenance and upgrades of access networks are disclosed. An example method comprises obtaining a first value representing a number of unassigned ports associated with a first digital subscriber line access multiplexer (DSLAM), obtaining a second value representing a projected number of ports associated with the first DSLAM needed to satisfy at least one of anticipated, projected or pending service requests, and determining whether to automatically submit a preventative maintenance trouble ticket for the first DSLAM based on the first and second values.

25 Claims, 5 Drawing Sheets

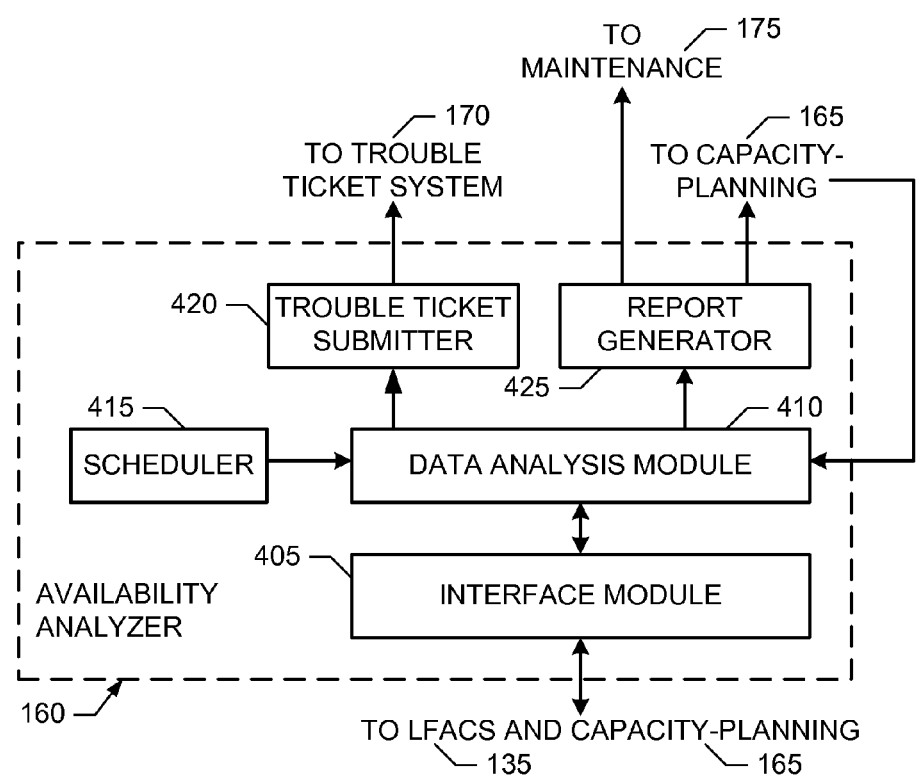

METHODS AND APPARATUS TO TRIGGER MAINTENANCE AND UPGRADES OF ACCESS NETWORKS

FIELD OF THE DISCLOSURE

This disclosure relates generally to access networks and, more particularly, to methods and apparatus to trigger maintenance and upgrades of access networks.

BACKGROUND

Access networks and/or systems using digital subscriber line (DSL) technologies are commonly utilized to provide communication services to customer premises. DSL technologies enable service providers to utilize telephone lines to connect customers to, for example, a high data-rate broadband Internet network, a broadband service and/or broadband content. An example telephone line uses twisted-pair copper wire to provide Plain Old Telephone System (POTS) services. A communication company and/or service provider may utilize a plurality of DSL modems implemented by a DSLAM and/or a video ready access device (VRAD) at a central office (CO), a remote terminal (RT) or a serving area interface (SAI) to provide DSL communication services to a plurality of customer-premises DSL modems located at respective customer premises. In general, a DSLAM/VRAD receives broadband service content for a subscriber from, for example, a backbone server. A CO DSL modem at the DSLAM/VRAD forms from the content a downstream DSL signal to be transmitted to a customer-premises DSL modem via a telephone line that electrically couples the CO DSL modem at the SAI, RT or CO to the customer-premises DSL modem. Likewise, the CO DSL modem receives an upstream DSL signal from the customer-premises DSL modem via the corresponding subscriber's telephone line, and the DSLAM/VRAD provides the data received via the upstream DSL signal to the backbone server.

BRIEF DESCRIPTION OF THE DRAWINGS

FIG. 2 illustrates an example maintenance report that may be generated by the example availability analyzer of the FIG. 1.

FIG. 3 illustrates an example capacity-planning report that may be generated by the example availability analyzer of FIG. 1.

FIG. 4 illustrates an example manner of implementing the example availability analyzer of FIG. 1.

DETAILED DESCRIPTION

Example methods and apparatus to trigger maintenance and upgrades of access networks are disclosed. A disclosed example method includes obtaining a first value representing a number of unassigned ports associated with a first digital subscriber line (DSL) access multiplexer (DSLAM), obtaining a second value representing a projected number of ports associated with the first DSLAM needed to satisfy at least one of anticipated, projected or pending service requests, and determining whether to automatically submit a preventative maintenance trouble ticket for the first DSLAM based on the first and second values.

A disclosed example apparatus includes a trouble ticket system, a loop facility assignment and control system (LFACS), a capacity-planning server and an availability analyzer. The LFACS is to provide a first value representing a number of unassigned ports associated with a first DSLAM. The capacity-planning server is to provide a second value representing a projected number of ports associated with the first DSLAM needed to satisfy at least one of anticipated, projected or pending service requests. The availability analyzer is to compare a first ratio of the first and second values to a first threshold to determine whether to automatically submit a maintenance trouble ticket for the first DSLAM to the trouble ticket system, the submitted trouble ticket identifying that one or more bad ports associated with the first DSLAM are to be investigated.

In the interest of brevity and clarity, throughout the following disclosure references will be made to an example access network 100 of FIG. 1. However, the methods and apparatus described herein to trigger maintenance and upgrades of access networks are applicable to other types of access networks and/or communication systems constructed using other network technologies, topologies and/or protocols. Other example systems include, but are not limited to, those associated with public switched telephone network (PSTN) systems, public land mobile network (PLMN) systems (e.g., cellular), wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, passive optical network (PON) systems, and/or any combination and/or hybrid of these devices, systems and/or networks.

Figure 1:
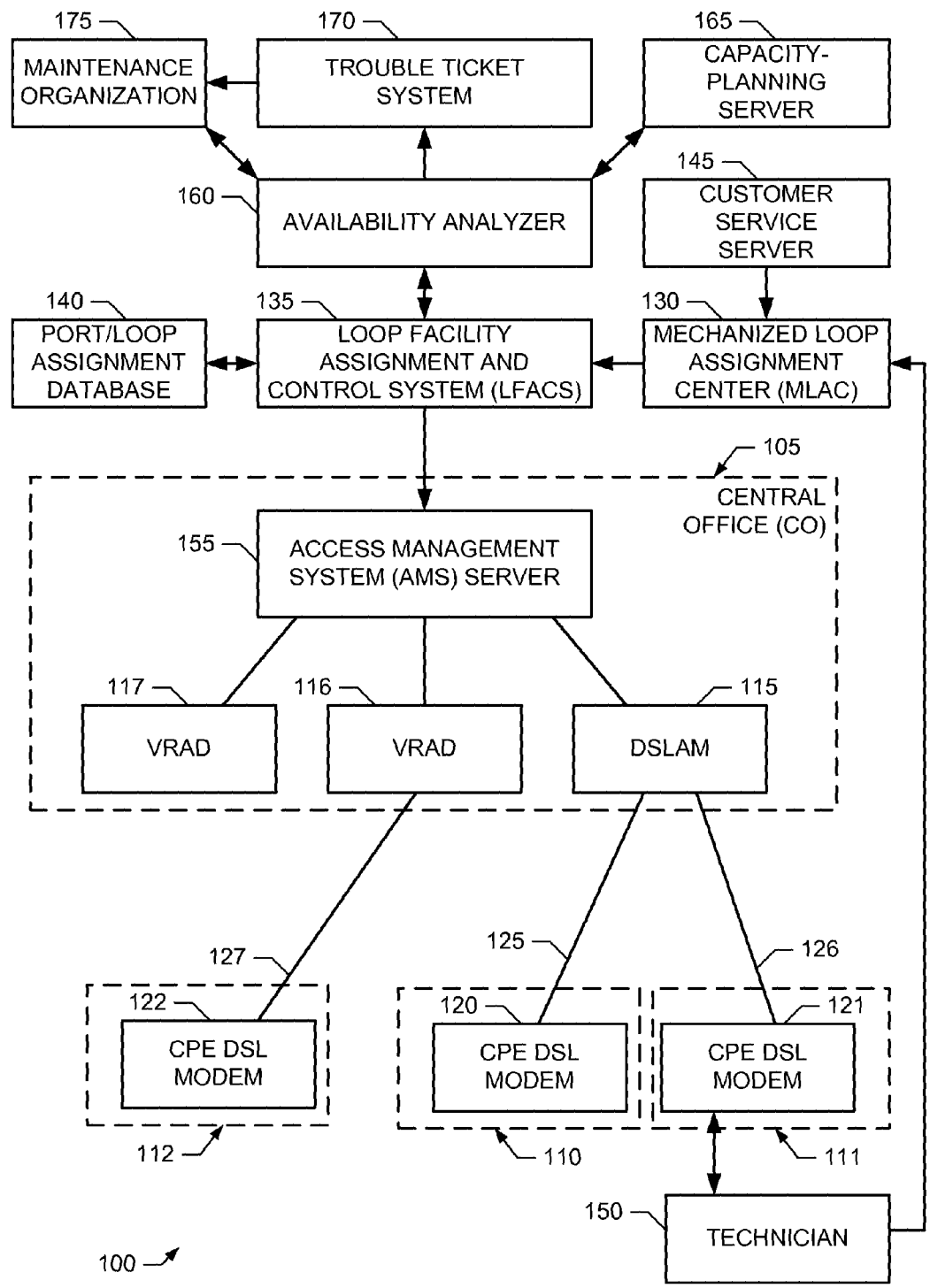
FIG. 1 is a schematic illustration of an example access network constructed in accordance with the teachings of this disclosure.

FIG. 1 illustrates the example access network 100. The example access network 100 of FIG. 1 includes any number and/or type(s) of central offices (COs), one of which is designated at reference numeral 105, remote terminals (RTs) and/or serving area interfaces (SAIs). The example CO 105 of FIG. 1, and/or other COs, RTs and/or SAIs are used to provide data and/or communication services to one or more customer premises, three of which are designated at reference numerals 110, 111 and 112. Example data and/or communication services include, but are not limited to, telephone services, Internet services, data services, messaging services, instant messaging services, electronic mail (email) services, chat services, video services, audio services, gaming services. To provide DSL communication services to the customer premises 110-112, the example CO 105 of FIG. 1 includes any number and/or type(s) of DSLAMs and/or video-ready access devices (VRADs), three of which are designated at reference numerals 115, 116 and 117, and the example customer premises 110-112 include any type(s) of customer-premises equipment (CPE) DSL modems 120, 121 and 122. The example DSLAM/VRADs 115-117 of FIG. 1 include and/or implement one or more CO DSL modems (not shown) for respective ones of the customer premises 110-112. CO DSL modems are sometimes referred to in the industry as "DSLAM ports," "VRAD ports," or simply "ports." The example DSLAMs/VRADs 115-117, the CO DSL modems within the DSLAMs/VRADs 115-117, and/or the example CPE DSL modems 120-122 of FIG. 1 may be implemented, for example, in accordance with the International Telecommunications Union-Telecommunications Sector (ITU-T) G.993.x family of standards for very high-speed DSL (VDSL), and/or the ITU-T G.992.x family of standards for asymmetric DSL (ADSL). However, the CO DSL modems and/or the CPE DSL modems 120-122 may be implemented in accordance with any past, present and/or future standard, specification and/or recommendation.

While in the illustrated example of FIG. 1, the DSLAMs/VRADs 115-117 are implemented at the CO 105, any of the DSLAMs/VRADs 115-117 may be, additionally or alternatively, implemented at an RT, at an SAI and/or at any other location between the CO 105 and the customer premises 110-112. In such instances, a fiber-optic cable (not shown) may be used, for example, to communicatively couple the remotely located DSLAM/VRAD 115-117 to the CO 105.

In the illustrated example of FIG. 1, the DSLAM 115 provides DSL services to the CPE DSL modems 120-122 via respective subscriber lines 125, 126 and 127. Subscriber lines are sometimes also referred to in the industry as "wire-pairs", "subscriber loops" and/or "loops." While throughout this disclosure reference is made to the example loops 125-127 of FIG. 1, a loop (e.g., any of the example loops 125-127) used to provide a DSL service to a customer-premises location (e.g., any of the locations 110-112) may include and/or be constructed from one or more segments of twisted-pair telephone wire (e.g., any combination of a feeder one (F1) cable, a feeder two (F2) cable, a feeder three (F3) cable, a feeder four (F4) cable, a distribution cable, a drop cable, and/or customer-premises wiring), terminals, and/or distributions points (e.g., an RT, an SAI, a serving terminal, a vault, a pedestal and/or any other type(s) of wiring distribution points). Such segments of twisted-pair telephone wire may be spliced and/or connected end-to-end, and/or may be connected at only one end, thereby creating one or more bridged-taps. Regardless of the number, type(s), gauge(s) and/or topology of twisted-pair telephone wires used to construct the example loops 125-127, they will be referred to herein in the singular form, but it will be understood that the term "loop" may refer to one or more twisted-pair telephone wire segments and may include one or more bridged taps.

To assign DSLAM/VRAD ports to the example loops 125-127, the example access network 100 of FIG. 1 includes any type of mechanized loop assignment center (MLAC) 130, any type of LFACS 135 and a port/loop assignment database 140. DSLAM/VRAD port to loop assignments may be stored in the example port/loop assignment database 140 of FIG. 1 using any number and/or type(s) of data structures. The example port/loop assignment database 140 may be stored in any number and/or type(s) of volatile and/or non-volatile memory(-ies) and/or memory device(s) (not shown).

In response to, for example, an order for new DSL service for a particular customer premises 110-112 received from, for example, any type of customer service server 145, the example MLAC 130 of FIG. 1 assigns and/or selects a particular port of a DSLAM/VRAD 115-117 to be used to provide the DSL service to that customer premises 110-112. The example customer service server 145 of FIG. 1 may interact with the example MLAC 130 using any number and/or type(s) of method(s), application programming interface(s) (API(s)) and/or logic. When the presently considered customer premises 110-112 is already associated with a particular loop (e.g., any of the example loops 125-127) to receive, for example, plain old telephone service (POTS), the example MLAC 130 associates the already associated loop with the selected DSLAM/VRAD port. When the presently considered customer premises 115-117 is not already associated with a loop 125-127, the MLAC 130 selects a loop 125-127 that is available between the DSLAM/VRAD 115-117 and the customer premises 110-111, and associates the selected loop 125-127 with the selected DSLAM/VRAD port.

The example MLAC 130 of FIG. 1 may also be accessed using an interactive voice response (IVR) and/or automated attendant system (not shown). For example, a technician 150 at the example customer premises 111 to install and/or troubleshoot the example CPE DSL modem 121 can telephone an IVR system implemented at the example MLAC 130 to request that the customer premises 111 be assigned a different DSLAM/VRAD port. Such port swap requests may occur to determine whether a problem associated with the CPE DSL modem 121 at the customer premises 111 is caused by a bad DSLAM/VRAD port. When such a DSLAM/VRAD port assignment change occurs, the example MLAC 130 and/or the example LFACS 135 flag the DSLAM/VRAD port as potentially bad, thereby making the flagged DSLAM/VRAD port unavailable for use by and/or assignment to other customer premises 110-112. In some circumstances, such a DSLAM/VRAD port swap may not resolve the issue(s) with the CPE DSL modem 121. Unless the example technician 150 subsequently accesses the MLAC 130 to indicate that the original DSLAM/VRAD port was not, in fact, bad, the original DSLAM/VRAD port will remain flagged as potentially faulty by the example MLAC 130 and the example LFACS 135. As such, some DSLAM/VRAD ports may remain unavailable for assignment and/or for use in diagnosing a service problem even though they may, in fact, be operating correctly. The example technician 150 may likewise request that a loop 125-127 associated with the customer premises 111 be changed and/or swapped. Swapped loops are likewise flagged as potentially bad and may become unavailable for use to provide services to another customer premises 110-112 unless the technician 150 subsequently indicates that the swapped loop was, in fact, not faulty. In some instances, the diagnostic swaps of ports and/or loops may be more prevalent during field trials and/or the deployment of new and/or emerging services.

The example technician 150 of FIG. 1 may, additionally or alternatively, interact with the example MLAC 130 via any type of wired and/or wireless communication technology. For example, the technician 150 may use a portable computer (not shown) to access the example MLAC 130 to request DSLAM/VRAD port and/or loop swaps.

The example MLAC 130 of FIG. 1 interacts with the example LFACS 135 to identify which DSLAM/VRAD ports and/or loops are available for assignment to a particular customer premises 110-112. In response to such requests, the example LFACS 135 of FIG. 1 queries the example port/loop assignment database 140. When a DSLAM/VRAD port and/or loop assignment and/or swap is identified by the MLAC 130, the example LFACS 135 of FIG. 1 updates the port/loop assignment database 140 and configures the corresponding DSLAM/VRAD 115-117 via any type of access management system 155.

To proactively monitor DSLAM/VRAD port utilization, the example access network 100 of FIG. 1 includes an availability analyzer 160. Based on DSLAM/VRAD port utilization information and/or loop utilization information stored in the example port/loop assignment database 140, the example availability analyzer 160 of FIG. 1 determines whether maintenance should be performed for a particular DSLAM/VRAD 115-117. Periodically and/or aperiodically, the example availability analyzer 160 queries the example LFACS 135 to obtain the number "A" of currently assigned ports, and the number "B" of ports that are flagged and/or identified as bad and/or potentially bad for a presently considered DSLAM/VRAD 115-117. The availability analyzer 160 also queries and/or obtains a desired number "N" of ports that are needed for pending and/or projected service needs for the presently considered DSLAM/VRAD 115-117 from any type of capacity-planning server, system and/or organization 165. Based on the numbers A and N, the example availability analyzer 160 of FIG. 1 determines whether maintenance is needed for the presently considered DSLAM/VRAD 115-117 to restore flagged ports and/or loops to a correctly operation state. For some loops and/or ports, a service technician may only need to test and verify that the port and/or loop was, in fact, fully operation and simply change its status in the port/loop assignment database 140 via the LFACS 135. In other circumstances, ports and/or loops may require repair and/or replacement in order to return them to an available state. The example availability analyzer 160 of FIG. 1 also uses the numbers A, B and N to determine whether the port capacity of a DSLAM/VRAD 115-117 and/or CO/RT/SAI needs to be upgraded. An example manner of implementing the example availability analyzer 160 of FIG. 1 is described below in connection with FIG. 4. An example process that may be carried out to implement the example availability analyzer 160 is described below in connection with FIGS. 5A and 5B.

By proactively monitoring port exhaustion for the example DSLAMs/VRADs 115-117 of FIG. 1, the example availability analyzer 160 provides a number of benefits to an operator of the example access network 100. For example, by proactively identifying DSLAMs/VRADs 115-117 that are in need of maintenance and/or upgrades, the example availability analyzer 160 can help ensure that enough ports are available to sell, promote and/or otherwise provide new services to additional customers, and/or to facilitate the timely and efficient resolution of reported and/or identified problems. For example, if there are no remaining available DSLAM/VRAD ports, the example technician 150 would be unable to request a port swap as part of a troubleshooting and/or diagnostic process. Such circumstances may result in wasted technician time, lost revenue, a diminished perceived image and/or reputation, and/or decreased customer satisfaction.

When the example availability analyzer 160 of FIG. 1 identifies a particular DSLAM/VRAD 115-117 as requiring maintenance to restore the DSLAM/VRAD 115-117 to a state having a sufficient number A of available ports and/or loops to support pending and/or projected service needs, the example availability analyzer 160 automatically generates and/or submits a maintenance ticket to any type of trouble ticket system 170. Such an automatically generated and/or submitted maintenance ticket represents preventative, prospective, forecasted and/or projected maintenance needs that should be performed in order to, for example, reduce the likelihood that a requested service cannot be installed and/or provisioned when requested by a subscriber and/or to reduce the likelihood that a reported service problem cannot be resolved in a timely manner. In response to the submitted maintenance ticket, an appropriate service and/or maintenance technician can be dispatched to return as many flagged ports and/or loops associated with the DSLAM/VRAD 115-117 to an operational state. If the number A of available ports is determined to be critically low relative to the number N of needed ports, the example availability analyzer 160 sets, adjusts and/or modifies a severity flag and/or priority value associated with the maintenance ticket to identify that maintenance for the DSLAM/VRAD 15-117 is needed and/or required on an urgent basis. The number A may be determined to be critically low when, for example, the ratio A/N is less than a predefined threshold.

Based on a plurality of numbers {B1, B2, . . . } of bad and/or potentially bad ports associated with respective DSLAMs/VRADs 115-117, the example availability analyzer 160 creates an ordered list of the DSLAMs/VRADs 115-117. The list of DSLAMs/VRADs 115-117 are ordered based upon their respective number B of bad and/or potentially bad ports. In some examples, only DSLAMs/VRADs 115-117 that have been identified as having an insufficient number A of available ports and/or loops are included in the ordered list. The list of ordered DSLAMs/VRADs 115-117 may be presented and/or accessed by a maintenance organization 175 via, for example, a web-based graphical user interface (GUI) and/or a web-based dashboard.

FIG. 2 illustrates an example maintenance report 200 that may be generated by the example availability analyzer 160 to present an ordered list of DSLAMs/VRADs 115-117. The example maintenance report 200 of FIG. 2 includes a plurality of entries 205 for respective ones of a plurality of DSLAMs/VRADs 115-117 that were analyzed by the example availability analyzer 160 and determined to require maintenance. To identify a DSLAM/VRAD 115-117, each of the example entries 205 of FIG. 2 includes an identifier field 210. Each of the example identifier fields 210 of FIG. 2 contains one or more values, letters and/or strings that uniquely identify a particular DSLAM/VRAD 115-117.

To store the number B of bad ports, each of the example entries 205 of FIG. 2 includes a bad field 215. Each of the example bad fields 215 of FIG. 2 contains a value that represents the number B of bad and/or potentially bad ports associated with the DSLAM/VRAD 115-117 represented by the corresponding identifier field 210. The example entries 205 of FIG. 2 are sorted based on values in the example bad fields 215 such that the DSLAM/VRAD 115-117 having the largest number B of bad and/or potentially bad ports (that is, in most need of maintenance) appears at the top of the example maintenance report 200 of FIG. 2.

To store the number A of available ports, each of the example entries 205 of FIG. 2 includes an available field 220. Each of the example available fields 220 of FIG. 2 contains a value that represents the number A of available ports associated with the DSLAM/VRAD 115-117 represented by the corresponding identifier field 210. To store the number N of needed ports, each of the example entries 205 of FIG. 2 includes a needed field 225. Each of the example needed fields 225 of FIG. 2 contains a value that represents the number N of available ports associated with the DSLAM/VRAD 115-117 represented by the corresponding identifier field 210.

To identify ports and/or loops that potentially require maintenance, each of the example entries 205 of FIG. 2 includes a port/loop identifier field 230. Each of the example port/identifier fields 230 of FIG. 2 contains one or more values and/or identifiers that represent each of the ports and/or loops associated with the DSLAM/VRAD 115-117 represented by the corresponding identifier field 210 that are currently flagged as bad and/or potentially bad.

While an example maintenance report 200 that may be generated and/or presented by the example availability analyzer 160 of FIG. 1 is illustrated in FIG. 2, the example maintenance report 200 may be implemented using any number and/or type(s) of other and/or additional entries, fields and/or data. Further, the entries, fields and/or data illustrated in FIG. 2 may be combined, divided, re-arranged, eliminated and/or implemented in any way. Further still, a maintenance report may include entries, fields and/or data in addition to, or instead of, those illustrated in FIG. 2, and/or may include more than one of any or all of the illustrated entries, fields and/or data.

Returning to FIG. 1, as described below in connection with FIG. 5A, the example availability analyzer 160 of FIG. 1 computes a capacity gap G for each analyzed DSLAM/VRAD 115-117. Based on a plurality of capacity gaps {G1, G2, . . . } associated with respective DSLAMs/VRADs 115-117, the example availability analyzer 160 creates another ordered list of the DSLAMs/VRADs 115-117. The additional list of DSLAMs/VRADs 115-117 is ordered based upon their respective capacity gap G. In some examples, only DSLAMs/VRADs 115-117 that have been identified as needing a capacity upgrade are included in this second ordered list. The second list of ordered DSLAMs/VRADs 115-117 may be presented and/or accessed by a user (not shown) of the example capacity-planning server 165 via, for example, a web-based GUI and/or a web-based dashboard.

FIG. 3 illustrates an example capacity-planning report 300 that may be generated by the example availability analyzer 160 to represent the second ordered list of DSLAMs/VRADs 115-117. The example capacity-planning report 300 of FIG. 3 includes a plurality of entries 305 for respective ones of a plurality of DSLAMs/VRADs 115-117 that were analyzed by the example availability analyzer 160 and determined to require a capacity upgrade. To identify a DSLAM/VRAD 115-117, each of the example entries 305 of FIG. 3 includes an identifier field 310. Each of the example identifier fields 310 of FIG. 3 contains one or more values, letters and/or strings that uniquely identify a particular DSLAM/VRAD 115-117.

To store a computed capacity gap G, each of the example entries 305 of FIG. 3 includes a gap field 315. Each of the example gap fields 315 of FIG. 3 contains a value that represents the gap between the pending and/or projected needs of the DSLAM/VRAD 115-117 represented by the corresponding identifier field 210 and the potential number of ports that could be available at the DSLAM/VRAD 115-117 assuming maintenance of the DSLAM/VRAD 115-117 is performed. The example entries 305 of FIG. 3 are sorted based on the example values stored in the gap fields 315 such that the DSLAM/VRAD 115-117 having the smallest capacity gap G (that is, in most need of a capacity upgrade) appears at the top of the capacity-planning report 300.

To store the number A of available ports, each of the example entries 305 of FIG. 3 includes an available field 320. Each of the example available fields 320 of FIG. 3 contains a value that represents the number A of available ports associated with the DSLAM/VRAD 115-117 represented by the corresponding identifier field 310. To store the number B of bad ports, each of the example entries 305 of FIG. 3 includes a bad field 325. Each of the example bad fields 325 of FIG. 3 contains a value that represents the number B of bad and/or potentially bad ports associated with the DSLAM/VRAD 115-117 represented by the corresponding identifier field 310. To store the number N of needed ports, each of the example entries 305 of FIG. 3 includes a needed field 330. Each of the example needed fields 330 of FIG. 3 contains a value that represents the number N of available ports associated with the DSLAM/VRAD 115-117 represented by the corresponding identifier field 310.

While an example capacity-planning report 300 that may be generated and/or presented by the example availability analyzer 160 of FIG. 1 is illustrated in FIG. 3, the example capacity-planning report 300 may be implemented using any number and/or type(s) of other and/or additional entries, fields and/or data. Further, the entries, fields and/or data illustrated in FIG. 3 may be combined, divided, re-arranged, eliminated and/or implemented in any way. Further still, a capacity-planning report may include entries, fields and/or data in addition to, or instead of, those illustrated in FIG. 3, and/or may include more than one of any or all of the illustrated entries, fields and/or data.

Returning to FIG. 1, to manage repair and/or maintenance reports, the example access network 100 of FIG. 1 includes the example trouble ticket system 170. The example trouble ticket system 170 of FIG. 1 implements any API via which the example availability analyzer 160 can submit a maintenance ticket. The example trouble ticket system 170 also routes a submitted maintenance ticket to a suitable repair, customer support and/or technical support person for resolution, and tracks the resolution of trouble tickets.

While an example access network 100 has been illustrated in FIG. 1, one or more of the interfaces, data structures, elements, processes and/or devices illustrated in FIG. 1 may be combined, divided, re-arranged, omitted, eliminated and/or implemented in any other way. Further, the example MLAC 130, the example LFACS 135, the example customer service server 145, the example AMS 155, the example availability server 160, the example capacity-planning server 165 and/or the example trouble ticket system 170 of FIG. 1 may be implemented by hardware, software, firmware and/or any combination of hardware, software and/or firmware. Thus, for example, any of the example MLAC 130, the example LFACS 135, the example customer service server 145, the example AMS 155, the example availability server 160, the example capacity-planning server 165 and/or the example trouble ticket system 170 may be implemented by one or more device(s), circuit(s), programmable processor(s), application specific integrated circuit(s) (ASIC(s)), programmable logic device(s) (PLD(s)) and/or field programmable logic device(s) (FPLD(s)), etc. Further still, an access network may include interfaces, data structures, elements, processes and/or devices instead of, or in addition to, those illustrated in FIG. 1 and/or may include more than one of any or all of the illustrated interfaces, data structures, elements, processes and/or devices.

FIG. 4 illustrates an example manner of implementing the example availability analyzer 160 of FIG. 1. To interact with the example LFACS 135 and/or the example capacity-planning server 165, the example availability analyzer 160 of FIG. 4 includes any type of interface module 405. An example interface module 405 is implemented in accordance with any past, present and/or future standard, specification and/or recommendation, such as the Institute of Electrical and Electronics Engineers (IEEE) 802.x family of standards for Ethernet. Additionally or alternatively, the example interface module 405 may implement any number and/or type(s) of customized and/or specific interfaces implemented by the example LFACS 135 and/or the example capacity-planning server 165.

To analyze the capacity of the example DSLAMs/VRADs 115-117, the example availability analyzer 160 of FIG. 4 includes a data analysis module 410. The example data analysis module 410 of FIG. 1 queries, via the example interface module 405, the example LFACS 135 to obtain the number "A" of currently assigned ports, and the number "B" of ports that are flagged and/or identified as bad and/or potentially bad for a presently considered DSLAM/VRAD 115-117. The example data analysis module 410 also queries and/or obtains a desired number "N" of ports that are needed for pending and/or projected service needs for the presently considered DSLAM/VRAD 115-117 from the capacity-planning server 165 via the interface module 405. Based on the obtained numbers A and N, the example data analysis module 410 of FIG. 4 determines whether maintenance is needed for the presently considered DSLAM/VRAD 115-117 to restore flagged ports and/or loops to a correctly operation state. The example data analysis module 410 also uses the numbers A, B and N to determine whether the port capacity of a DSLAM/VRAD 115-117 and/or CO/RT/SAI needs to be upgraded. An example process that may be carried out to implement the data analysis module 410 is described below in connection with FIGS. 5A and 5B.

To initiate DSLAM/VRAD port utilization analysis by the example data analysis module 410, the example availability analyzer 160 of FIG. 4 includes any type of scheduler 415. Based on any number and/or type(s) of criteria, the example scheduler 415 of FIG. 4 periodically or aperiodically directs the data analysis module 410 to analyze one or more of the example DSLAMs/VRADs 115-117. For example, the example scheduler 415 could initiate port and/or loop analysis on a daily, a weekly and/or a monthly basis. Additionally and/or alternatively, operation of the example data analysis module 410 may be trigger by, for example, a person associated with the example maintenance organization 175 and/or the capacity-planning server 165.

To interact with the example trouble ticket system 170 of FIG. 1, the example availability analyzer 160 of FIG. 4 includes a trouble ticket submitter 420. The example trouble ticket submitter 420 of FIG. 4 generates and submits maintenance tickets against DSLAMs/VRADs 115-117 that were identified by a data analysis module 410 as needing to have maintenance performed. The example trouble ticket submitter 420 submits a trouble ticket by, for example, accessing and/or utilizing an API provided and/or implemented by the example trouble ticket system 170. In some examples, the trouble ticket submitter 420 accesses the trouble ticket system 170 via the example interface module 405.

To generate maintenance and/or capacity-planning reports, the example availability analyzer 160 of FIG. 4 includes a report generator 425. Based on a plurality of numbers {B1, B2, . . . } of bad and/or potentially bad ports associated with respective DSLAMs/VRADs 115-117, the example report generator 425 of FIG. 4 creates a maintenance report, such as the example maintenance report 200 of FIG. 2. The example report generator 425 arranges a list of DSLAMs/VRADs 115-117 within the generated maintenance report based upon their respective number B of bad and/or potentially bad ports. In some examples, only DSLAMs/VRADs 115-117 that have been identified by the example data analysis module 410 as having an insufficient number A of available ports and/or loops are included in the maintenance report. The maintenance report may be presented and/or accessed by the example maintenance organization 175 of FIG. 1 via, for example, a web-based GUI and/or a web-based dashboard. In some examples, the report generator 425 presents and/or provides the maintenance report to the maintenance organization 175 via the example interface module 405.

Based on a plurality of capacity gaps {G1, G2, . . . } computed for respective DSLAMs/VRADs 115-117, the example report generator 425 of FIG. 4 creates a capacity-planning report, such as the example capacity-planning report 300 of FIG. 3. The example report generator 425 arranges a list of DSLAMs/VRADs 115-117 within the generated capacity-planning report based upon their respective capacity gap G values. In some examples, only DSLAMs/VRADs 115-117 that have been identified by the example data analysis module 410 as needing a capacity upgrade are included in the capacity-planning report. The capacity-planning report may be presented and/or accessed by a user (not shown) of the example capacity-planning server 165 via, for example, a web-based GUI and/or a web-based dashboard. In some examples, the report generator 425 presents and/or provides the capacity report to the capacity-planning server 165 via the example interface module 405.

While an example manner of implementing the example availability analyzer 160 of FIG. 1 has been illustrated in FIG. 4, one or more of the elements, processes, interfaces and/or devices illustrated in FIG. 4 may be combined, divided, rearranged, omitted, eliminated and/or implemented in any other way. Further, the example interface module 405, the example data analysis module 410, the example scheduler 415, the example trouble ticket submitter 420, the example report generator 425 and/or, more generally, the example availability analyzer 160 of FIG. 4 may be implemented by hardware, software, firmware and/or any combination of hardware, software and/or firmware. Thus, for example, any or all of the example interface module 405, the example data analysis module 410, the example scheduler 415, the example trouble ticket submitter 420, the example report generator 425 and/or, more generally, the example availability analyzer 160 may be implemented by one or more circuit(s), programmable processor(s), ASIC(s), PLD(s) and/or FPLD(s), etc. Further still, an availability analyzer may include one or more elements, processes, interfaces and/or devices in addition to, or instead of, those illustrated in FIG. 4, and/or may include more than one of any or all of the illustrated elements, processes, interfaces and devices.

Figure 5A:
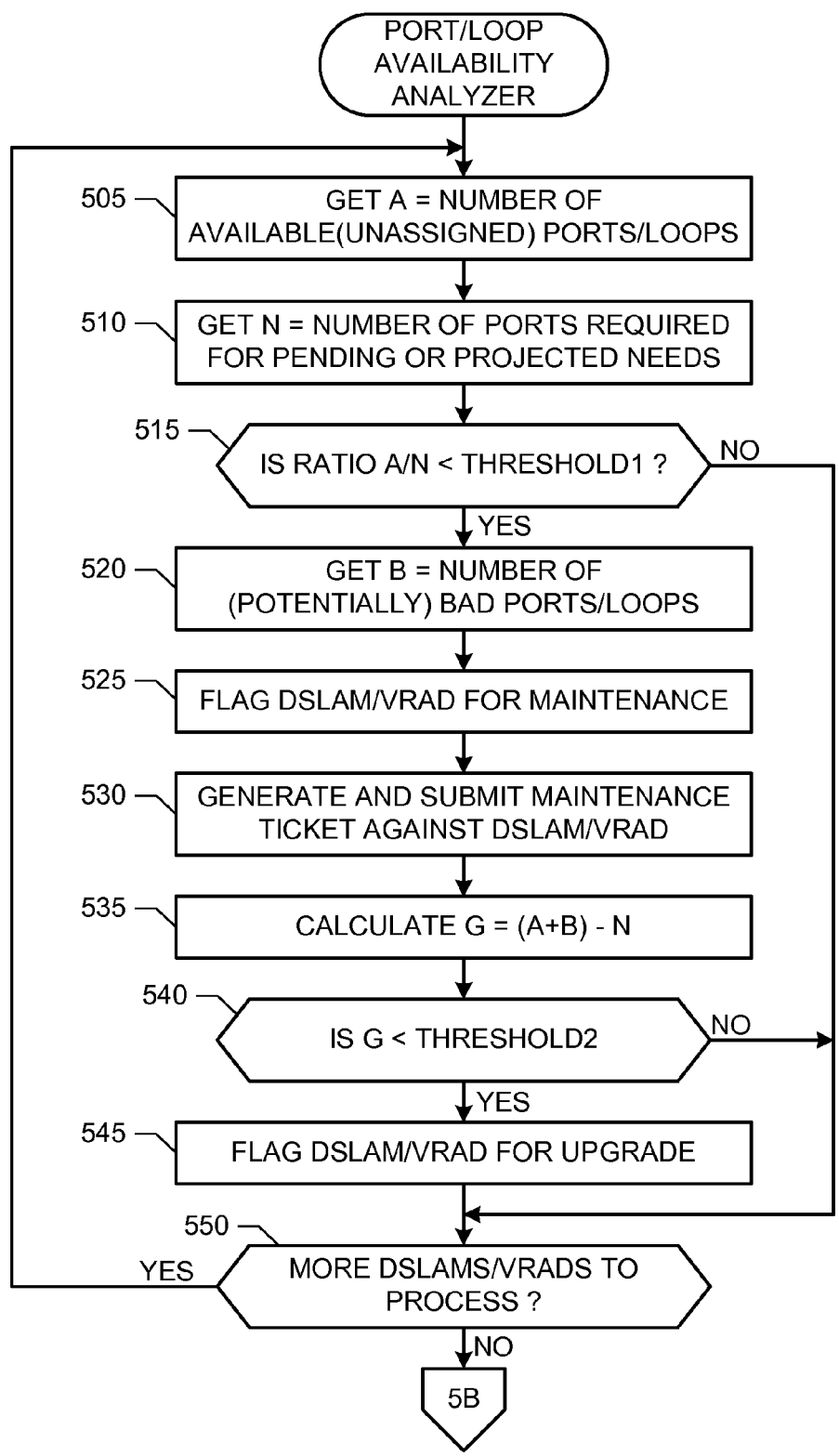
FIGS. 5A and 5B are collectively a flowchart representative of an example process that may be carried out to implement the example availability analyzers of FIGS. 1 and 4.
Figure 5B:
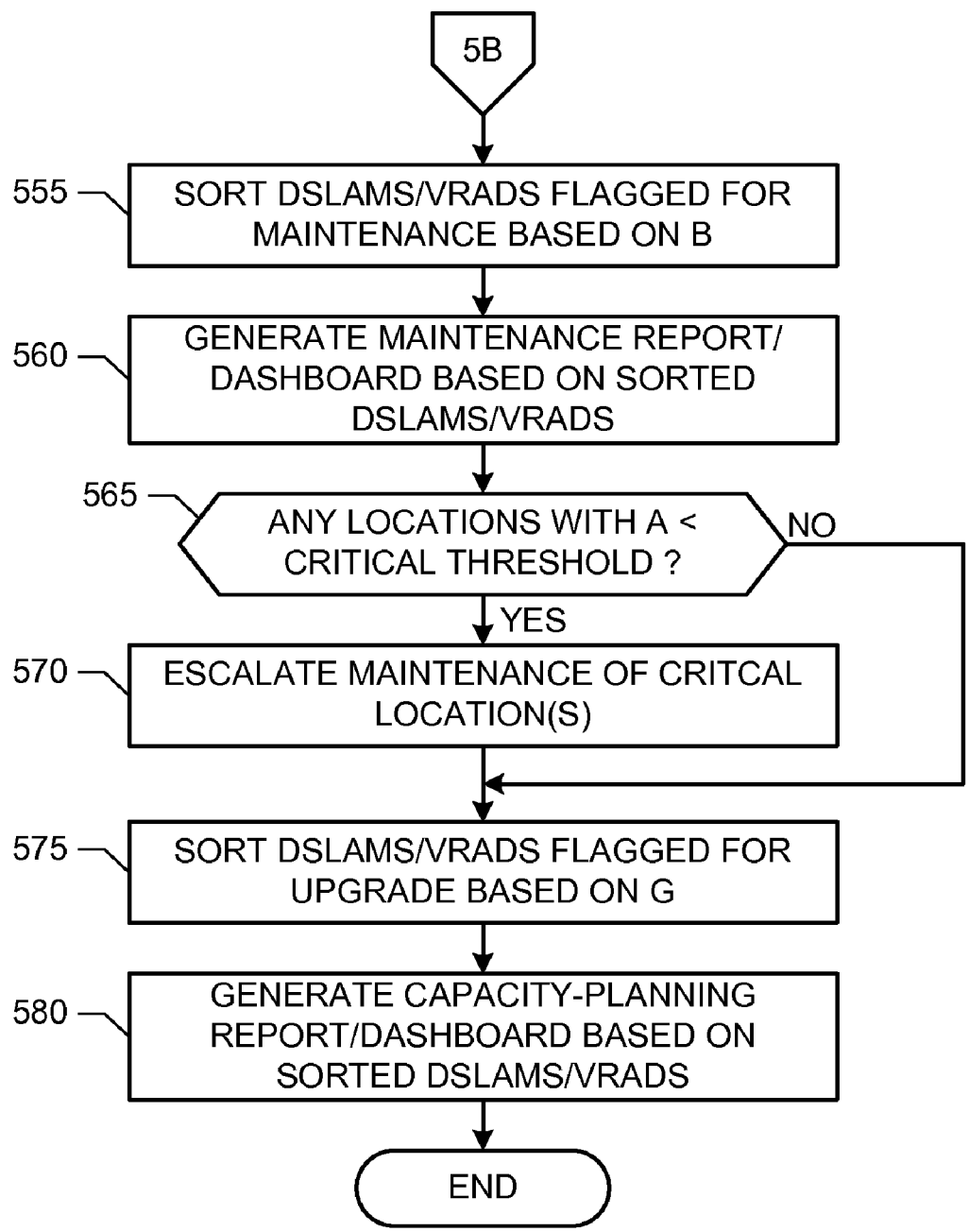

FIGS. 5A and 5B collectively illustrate a flowchart representative of an example process that may be carried out to implement the example availability analyzer 160 of FIGS. 1 and 4. The example process of FIGS. 5A and 5B may be carried out by a processor, a controller and/or any other suitable processing device. For example, the example process of FIGS. 5A and 5B may be embodied in coded instructions stored on any tangible computer-readable medium such as a flash memory, a compact disc (CD), a digital versatile disc (DVD), a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-accessible instructions or data structures, and which can be accessed by a processor, a general-purpose or special-purpose computer, or other machine with a processor (e.g., the example processor platform P100 discussed below in connection with FIG. 6). Combinations of the above are also included within the scope of computer-readable media. Machine-accessible instructions comprise, for example, instructions and/or data that cause a processor, a general-purpose computer, special-purpose computer, or a special-purpose processing machine to implement one or more particular processes. Alternatively, some or all of the example process of FIGS. 5A and 5B may be implemented using any combination(s) of ASIC(s), PLD(s), FPLD(s), discrete logic, hardware, firmware, etc. Also, some or all of the example process of FIGS. 5A and 5B may instead be implemented manually or as any combination of any of the foregoing techniques, for example, any combination of firmware, software, discrete logic and/or hardware. Further, many other methods of implementing the example operations of FIGS. 5A and 5B may be employed. For example, the order of execution of the blocks may be changed, and/or one or more of the blocks described may be changed, eliminated, subdivided, or combined. Additionally, any or all of the example process of FIGS. 5A and 5B may be carried out sequentially and/or carried out in parallel by, for example, separate processing threads, processors, devices, discrete logic, circuits, etc.

The example process of FIGS. 5A and 5B begins with the example data analysis module 410 of FIG. 4 obtaining from the example LFACS 135 via the example interface module 405 the number A of available ports and/or loops associated with a presently considered DSLAM/VRAD 115-117 (block 505). The data analysis module 410 obtains from the example capacity-planning server 165 via the example interface module 405 the number N of needed ports and/or loops for the presently considered DSLAM/VRAD 115-117 (block 510). If a ratio of A and N (that is, A/N) is less than a first threshold (block 515), the data analysis module 410 obtains from the example LFACS 135 the number B of bad and/or potentially bad ports and/or loops associated with the presently considered DSLAM/VRAD 115-117 (block 520). The data analysis module 410 tags or flags the presently considered DSLAM/VRAD 115-117 as needing maintenance (block 525) and the example trouble ticket submitter 420 of FIG. 4 generates and submits a maintenance ticket against the presently considered DSLAM/VRAD 115-117 (block 530).

The data analysis module 410 calculates the capacity gap G of the presently considered DSLAM/VRAD 115-117 (block 535). An example capacity gap value G is computed using the following mathematical expression: G=(A+B)−N. If the computed capacity gap value G is less than a second threshold (block 540), the data analysis module 410 tags or flags the presently considered DSLAM/VRAD 115-117 for a capacity upgrade (block 545). In some examples, the first and second thresholds have the same value. If the computed capacity gap G is not less than the second threshold (block 540), control proceeds to block 550 without flagging the presently considered DSLAM/VRAD 115-117 for a capacity upgrade.

Returning to block 515, if the ratio A/N is not less than the first threshold (block 515), control proceeds to block 550 without flagging the presently considered DSLAM/VRAD 115-117 for maintenance and without flagging the presently considered DSLAM/VRAD 115-117 for a capacity upgrade.

At block 550, if there are more DSLAMs/VRADs to process (block 550), control returns to block 505 to process the next DSLAM/VRAD 115-117. If there are no more DSLAMs/VRADs 115-117 to process (block 550), control proceeds to block 555 of FIG. 5B.

The example report generator 425 of FIG. 4 sorts the DSLAMs/VRADs 115-117 that were flagged by the data analysis module 410 for maintenance based on their associated numbers B or bad and/or potentially bad ports (block 555 of FIG. 5B). Based on the ordered list of flagged DSLAMs/VRADs 115-117, the report generator 425 creates a maintenance report and/or web-based dashboard, such as the example maintenance report 200 of FIG. 2 (block 560).

If any DSLAMs/VRADs 115-117 have a critically low number A of available ports (block 565), the example trouble ticket submitter 420 escalates and/or prioritizes maintenance of the DSLAM(s)/VRAD(s) 115-117 by, for example, setting a priority value and/or severity flag associated with a generated and/or submitted maintenance ticket to severe (block 570).

The example report generator 425 sorts the DSLAMs/VRADs 115-117 that were flagged by the data analysis module 410 for capacity upgrades (block 575). Based on the ordered list of flagged DSLAMs/VRADs 115-117, the report generator 425 creates a capacity-planning report and/or web-based dashboard, such as the example capacity-planning report 300 of FIG. 3 (block 580). Control then exits from the example process of FIGS. 5A and 5B.

Figure 6:
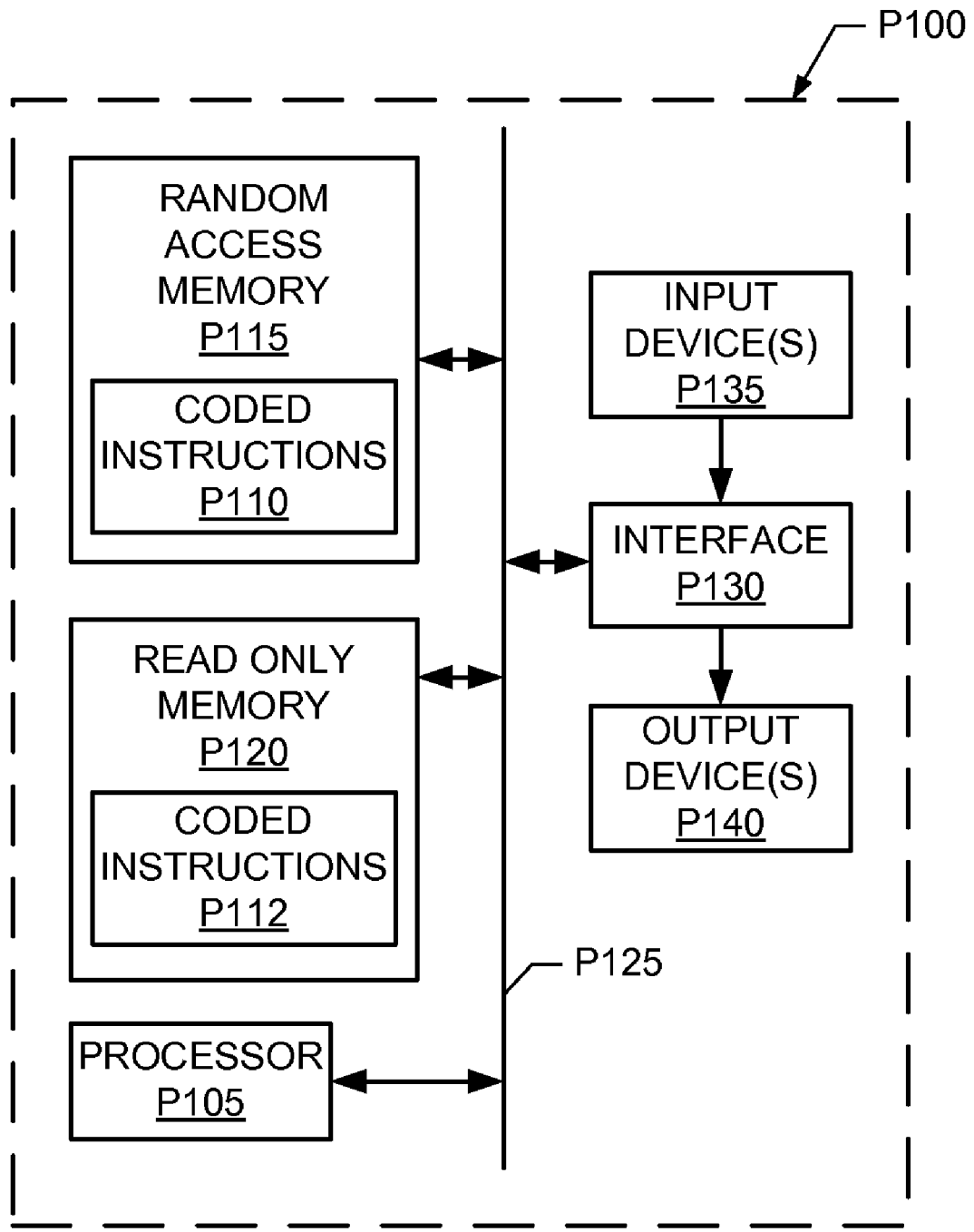
FIG. 6 is a schematic illustration of an example processor platform that may be used and/or programmed to carry out the example process of FIGS. 5A and 5B, and/or to implement any or all of the methods and apparatus disclosed herein.

FIG. 6 is a schematic diagram of an example processor platform P100 that may be used and/or programmed to implement the example availability analyzers 160 of FIGS. 1 and 4. For example, the processor platform P100 can be implemented by one or more general-purpose processors, processor cores, microcontrollers, etc.

The processor platform P100 of the example of FIG. 6 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example process of FIGS. 5A and 5B to implement the example methods and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). One or both of the example memories P115 and P120 may be used to implement the example port/loop assignment database 140 of FIG. 1.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The input devices P135 and/or output devices P140 may be used to, for example, implement the interface module 405 of FIG. 4.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
obtaining a first value representing a number of unassigned ports associated with a first digital subscriber line access multiplexer;
obtaining a second value representing a projected number of ports associated with the first digital subscriber line access multiplexer needed to satisfy at least one of anticipated, projected or pending service requests; and
determining whether to automatically submit a preventative maintenance trouble ticket for the first digital subscriber line access multiplexer based on the first and second values.

2. A method as defined in claim 1, wherein determining whether to automatically submit the maintenance trouble ticket for the first digital subscriber line access multiplexer based on the first and second values comprises comparing a first ratio of the first and second values to a first threshold, and wherein the submitted trouble ticket identifies that one or more bad ports associated with the first digital subscriber line access multiplexer are to be investigated.

3. A method as defined in claim 2, further comprising:
obtaining a third value representing a number of unassigned ports associated with a second digital subscriber line access multiplexer;

obtaining a fourth value representing a projected number of ports associated with the second digital subscriber line access multiplexer needed to satisfy second anticipated service requests;

computing a second ratio of the third and fourth values;

generating a maintenance report that includes the first and second digital subscriber line access multiplexers, wherein the first and second digital subscriber line access multiplexers are ordered within the report based on the first and second ratios.

4. A method as defined in claim 3, further comprising presenting a web-based interface that includes the generated maintenance report.

5. A method as defined in claim 3, further comprising:
obtaining a fifth value representing a number of bad ports or potentially bad ports associated with the first digital subscriber line access multiplexer;
computing a first capacity gap for the first digital subscriber line access multiplexer based on the first, second and fifth values; and
obtaining a sixth value representing a number of bad ports or potentially bad ports associated with the second digital subscriber line access multiplexer;
computing a second capacity gap for the second digital subscriber line access multiplexer based on the third, fourth and sixth values; and
generating a capacity-planning report that includes the first and second digital subscriber line access multiplexers, wherein the first and second digital subscriber line access multiplexers are ordered within the report based on the first and second capacity gaps.

6. A method as defined in claim 2, further comprising comparing the first ratio to a second threshold to determine whether to automatically escalate maintenance for the first digital subscriber line access multiplexer.

7. A method as defined in claim 6, wherein escalating the maintenance of the first digital subscriber line access multiplexer comprises, modifying a severity flag associated with the automatically submitted maintenance trouble ticket for the first digital subscriber line access multiplexer.

8. A method as defined in claim 1, further comprising:
obtaining a third value representing a number of bad ports or potentially bad ports associated with the first digital subscriber line access multiplexer;
computing a capacity gap for the first digital subscriber line access multiplexer based on the first, second and third values; and
comparing the computed capacity gap to a second threshold to determine whether to automatically flag the first digital subscriber line access multiplexer for a capacity upgrade.

9. A method as defined in claim 8, wherein computing the capacity gap comprises:
computing a first sum of the first and third values; and
subtracting the second value from the second value.

10. A method as defined in claim 8, wherein the second threshold comprises the first threshold.

11. A method as defined in claim 8, wherein the third value represents the number of bad ports or potentially bad ports associated with the first digital subscriber line access multiplexer and a number of bad loops or potentially bad loops associated with the first digital subscriber line access multiplexer.

12. An apparatus comprising:
a trouble ticket system;
a loop facility assignment and control system to provide a first value representing a number of unassigned ports associated with a first digital subscriber line access multiplexer;
a capacity-planning server to provide a second value representing a projected number of ports associated with the first digital subscriber line access multiplexer needed to satisfy at least one of anticipated, projected or pending service requests; and
an availability analyzer to compare a first ratio of the first and second values to a first threshold to determine whether to automatically submit a maintenance trouble ticket for the first digital subscriber line access multiplexer to the trouble ticket system, the submitted trouble ticket identifying that one or more bad ports associated with the first digital subscriber line access multiplexer are to be investigated.

13. An apparatus as defined in claim 12, wherein the loop facility assignment and control system is to provide a third value representing a number of bad ports or potentially bad ports associated with the first digital subscriber line access multiplexer, and wherein the availability analyzer is to compute a capacity gap for the first digital subscriber line access multiplexer based on the first, second and third values and to compare the computed capacity gap to a second threshold to determine whether to automatically flag the first digital subscriber line access multiplexer for a capacity upgrade.

14. An apparatus as defined in claim 12, wherein the data analyzer comprises:
an loop facility assignment and control system interface module to obtain the first value from the loop facility assignment and control system;
a data analyzer to compute the first ratio and to compare the first ratio to the first threshold; and
a trouble ticket submitter to generate and submit the maintenance trouble ticket to the trouble ticket system.

15. An apparatus as defined in claim 14, further comprising a scheduler to at least one of periodically or aperiodically trigger the data analysis module to compute the first ratio.

16. An apparatus as defined in claim 14, wherein the data analyzer is to compare the first ratio to a second threshold to determine whether to automatically escalate maintenance for the first digital subscriber line access multiplexer, and wherein the trouble ticket submitter is to escalate the maintenance by modifying a severity flag associated with the generated maintenance trouble ticket.

17. An apparatus as defined in claim 12, wherein the loop facility assignment and control system is to provide a third value representing a number of unassigned ports associated with a second digital subscriber line access multiplexer, wherein the capacity-planning server is to provide a fourth value representing a projected number of ports associated with the second digital subscriber line access multiplexer needed to satisfy second anticipated service requests, and wherein the availability analyzer comprises:
a data analyzer to compute a second ratio of the third and fourth values; and
a report generator to generate a maintenance report that includes the first and second digital subscriber line access multiplexers, wherein the first and second digital subscriber line access multiplexers are ordered within the report based on the first and second ratios.

18. An apparatus as defined in claim 17, wherein the report generator is to generate a web-based interface that includes the generated maintenance report.

19. An article of manufacture comprising a tangible machine readable storage medium storing machine-accessible instructions that, when executed, cause a machine to, at least:
- obtain a first value representing a number of unassigned ports associated with a first digital video-ready access device;
- obtain a second value representing a projected number of ports associated with the first video-ready access device needed to satisfy at least one of anticipated, projected or pending service requests; and
- compare a first ratio of the first and second values to a first threshold to determine whether to automatically submit a maintenance trouble ticket for the first video-ready access device, the submitted trouble ticket identifying that one or more bad ports associated with the first video-ready access device are to be investigated.

20. An article of manufacture as defined in claim 19, wherein the machine-accessible instructions, when executed, cause the machine to:
- obtain a third value representing a number of bad ports or potentially bad ports associated with the first video-ready access device;
- compute a capacity gap for the first video-ready access device based on the first, second and third values; and
- compare the computed capacity gap to a second threshold to determine whether to automatically flag the first video-ready access device for a capacity upgrade.

21. An article of manufacture as defined in claim 20, wherein the machine-accessible instructions, when executed, cause the machine to compute the capacity gap by:
- computing a first sum of the first and third values; and
- subtracting the second value from the second value.

22. An article of manufacture as defined in claim 19, wherein the machine-accessible instructions, when executed, cause the machine to:
- obtain a third value representing a number of unassigned ports associated with a second video-ready access device;
- obtain a fourth value representing a projected number of ports associated with the second video-ready access device needed to satisfy second anticipated service requests;
- compute a second ratio of the third and fourth values;
- generate a maintenance report that includes the first and second video-ready access devices, wherein the first and second video-ready access devices are ordered within the report based on the first and second ratios.

23. An article of manufacture as defined in claim 22, wherein the machine-accessible instructions, when executed, cause the machine to present a web-based interface that includes the generated maintenance report.

24. An article of manufacture as defined in claim 22, wherein the machine-accessible instructions, when executed, cause the machine to:
- obtain a fifth value representing a number of bad ports or potentially bad ports associated with the first video-ready access device;
- compute a first capacity gap for the first video-ready access device based on the first, second and fifth values; and
- obtain a sixth value representing a number of bad ports or potentially bad ports associated with the second video-ready access device;
- compute a second capacity gap for the second video-ready access device based on the third, fourth and sixth values; and
- generate a capacity-planning report that includes the first and second video-ready access devices, wherein the first and second video-ready access devices are ordered within the report based on the first and second capacity gaps.

25. An article of manufacture as defined in claim 19, wherein the machine-accessible instructions, when executed, cause the machine to compare the first ratio to a second threshold to determine whether to automatically escalate maintenance for the first video-ready access device.

* * * * *